US008559826B2

(12) United States Patent
Hongo et al.

(10) Patent No.: US 8,559,826 B2

(45) Date of Patent: Oct. 15, 2013

(54) DIGITAL IMAGE SENDER, DIGITAL IMAGE RECEIVER, DIGITAL IMAGE TRANSMISSION SYSTEM AND DIGITAL IMAGE TRANSMISSION METHOD

(75) Inventors: Kazuhiro Hongo, Kanagawa (JP); Kazunari Yoshifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 684 days.

(21) Appl. No.: 11/789,076

(22) Filed: Apr. 23, 2007

(65) Prior Publication Data

US 2007/0285582 A1 Dec. 13, 2007

(30) Foreign Application Priority Data

May 1, 2006 (JP) ................................ 2006-127811

(51) Int. Cl.

| | |
|---|---|
| ***H04N 5/38*** | (2006.01) |
| ***H04N 5/44*** | (2011.01) |
| ***H04J 3/04*** | (2006.01) |
| ***H04B 10/12*** | (2011.01) |

(52) U.S. Cl.

USPC ........... 398/155; 398/154; 398/140; 398/141; 348/723; 348/725

(58) Field of Classification Search

USPC .................................................. 398/155, 141

See application file for complete search history.

(56) References Cited

U.S. PATENT DOCUMENTS

| | | | | |
|---|---|---|---|---|
| 6,628,214 | B1 * | 9/2003 | Kawase et al. | 341/100 |
| 2001/0021051 | A1 * | 9/2001 | Kim | 359/161 |
| 2002/0181608 | A1 * | 12/2002 | Kim et al. | 375/295 |
| 2004/0228370 | A1 * | 11/2004 | Riesenman et al. | 370/537 |
| 2004/0263941 | A1 * | 12/2004 | Chen et al. | 359/245 |
| 2005/0063707 | A1 * | 3/2005 | Imai | 398/141 |
| 2005/0094676 | A1 * | 5/2005 | Iwami et al. | 370/527 |
| 2005/0259242 | A1 * | 11/2005 | Bridge et al. | 356/73.1 |
| 2006/0008276 | A1 * | 1/2006 | Sakai et al. | 398/141 |
| 2006/0069829 | A1 * | 3/2006 | Thornton | 710/106 |

FOREIGN PATENT DOCUMENTS

| | | |
|---|---|---|
| JP | 2002-366340 | 12/2002 |
| JP | 2005-073220 | 3/2005 |

* cited by examiner

*Primary Examiner* — Kenneth N Vanderpuye

*Assistant Examiner* — Oommen Jacob

(74) *Attorney, Agent, or Firm* — Robert J. Depke; The Chicago Technology Law Group, LLC

(57) ABSTRACT

Herein disclosed a digital image sender for transmitting a digital image signal including image signals for color image reproduction, a reference clock signal and parallel control signals, including: a parallel/serial converter configured to convert the parallel control signals into a serial control signal by time division multiplexing; a superposition element configured to superpose the serial control signal obtained by the conversion by said parallel/serial converter on the reference clock signal and output a resulting superposition signal; and an electro-optic converter configured to convert the superposition signal outputted from said superposition element from an electric signal into an optical signal.

22 Claims, 10 Drawing Sheets

DIGITAL IMAGE SENDER, DIGITAL IMAGE RECEIVER, DIGITAL IMAGE TRANSMISSION SYSTEM AND DIGITAL IMAGE TRANSMISSION METHOD

CROSS REFERENCES TO RELATED APPLICATIONS

The present invention contains subject matter related to Japanese Patent Application JP 2006-127811 filed with the Japan Patent Office on May 1, 2006, the entire contents of which being incorporated herein by reference.

BACKGROUND OF THE INVENTION

1. Field of the Invention

This invention relates to a digital image sender, a digital image receiver, a digital image transmission system and a digital image transmission method which allow long-haul transmission of a digital image signal.

2. Description of the Related Art

In recent years, the DVI (Digital Visual Interface) standards used principally in computers and the HDMI (High Definition Multimedia Interface) standards which define additional functions for home appliances based on the DVI standards have been proposed for the transmission of a digital image signal.

Digital transmission based on the interface standards mentioned decreases fluctuation and blurring of an image, inaccuracy in color development and so forth, which have been subjects of existing analog transmission to be solved. However, where such digital transmission is implemented using, for example, metal wires such as a coaxial cable, the distance over which a digital image signal can be transmitted while the quality thereof is maintained is approximately 5 to 10 m. In order to solve this problem, digital video signal interface modules which use an optical fiber only for the transmission of parallel digital image signals and a reference clock signal of a comparatively high speed have been proposed. One of such digital video signal interface modules is disclosed, for example, in Japanese Patent Laid-Open No. 2002-366340 (hereinafter referred to as Patent Document 1).

FIG. 9 shows an example of a configuration of such a digital video signal interface module as disclosed in Patent Document 1. Referring to FIG. 9, the digital video signal interface module shown includes a computer 401, a sender connector 433, optical fibers 437, a receiver connector 435, an LCD monitor 402, and metal wires 440 to 444.

The sender connector 433 includes four laser diodes 438 for transmitting four optical signals including R, G and B digital image signals and a reference clock signal, and a laser driver 430 for driving the laser diodes 438. The receiver connector 435 includes four photodiodes 439 for receiving the four optical signals and a PD (photodiode) amplifier 432 for driving the photodiodes 439.

R, G and B digital image signals and a reference clock signal are outputted from the computer 401 and electro-optically converted from electric signals into optical signals for individual channels by the laser driver 430 and the laser diodes 438 of the sender connector 433. Then, the optical signals are transmitted for the individual channels by the optical fibers 437.

The transmitted signals are opto-electrically converted from optical signals into electric signals for the individual channels by the photodiodes 439 and the PD amplifier 432 of the receiver connector 435 and then inputted to the LCD monitor 402.

On the other hand, parallel control signals such as Vcc, Ground, DDC DATA, DDC CLOCK and HPD signals are transmitted in parallel by the metal wires 440 to 444, respectively. The digital video signal interface module is configured in this manner.

FIG. 10 shows a cross section of a composite cable 450 which is used in the digital video signal interface module described above.

Referring to FIG. 10, the composite cable 450 shown includes optical fibers 437, a power supply line 440, a grounding line 441, a DDC data line 442, a DDC clock line 443, and an HPD line 444. The R, G and B digital image signals and the reference clock signal mentioned hereinabove are optically transmitted through the four optical fibers 437 while the five parallel control signals mentioned hereinabove are electrically transmitted by the five metal wires 440 to 444. In the composite cable 450, since electromagnetic interference (EMI) from the metal wires 440 to 444 makes a problem, a coating is applied to each metal wire in order to reduce the EMI.

The interface module described above with reference to FIG. 9 uses such a composite cable 450 as described above with reference to FIG. 10 to transmit the R, G and B digital image signals and the reference clock signal using four optical fibers thereby to implement long-haul transmission of a digital video signal.

Meanwhile, a digital image communication apparatus is disclosed in Japanese Patent Laid-Open No. 2005-73220 (hereinafter referred to as Patent Document 2). According to the digital image communication apparatus disclosed in Patent Document 2, a digital image signal which includes parallel digital image signals at least including RGB image signals and a reference clock signal is transmitted in the following manner. In particular, a carrier clock signal is produced based on the reference clock signal and is used to convert the parallel digital image signals at least including the RGB image signals into a serial digital signal. Then, the serial digital signal is converted into and transmitted as an optical signal. Where such an apparatus configuration as just described is adopted, the R, G and B digital image signals and the reference clock signal can be transmitted by a single optical fiber. Therefore, the number of optical fibers can be reduced.

SUMMARY OF THE INVENTION

However, the digital video signal interface module and the digital image communication apparatus described above have the following problems.

(1) According to the digital video signal interface module disclosed in Patent Document 1, a composite cable wherein, for example, four optical fibers and five metal wires are bundled is used for the transmission.

However, such a composite cable of optical fibers and metal wires as just described has a generally large diametrical size and lacks in flexibility. Accordingly, the composite cable is cumbersome in installation and use and usually needs a high cost.

(2) According to the digital image communication apparatus disclosed in Patent Document 2, parallel image signals of a comparatively high speed are parallel/serial converted and transmitted as a higher speed signal.

However, a demand not only for a higher resolution of an image signal but also for a wider color bandwidth and a higher frame rate has been and is increasing in recent years. Therefore, there is the possibility that the transmission rate of a digital image signal may rise to a band of 10 Gbps or more. In this instance, in order to transmit a high speed serial image signal, also various devices such as multiplexers and demultiplexers must cope with the high rate. Therefore, there is the possibility that the entire apparatus may require a higher cost.

Therefore, it is demanded to provide a digital image sender, a digital image receiver, a digital image transmission system and a digital image transmission method wherein a digital image signal can be transmitted over a long distance using an optical fiber cable which includes, for example, only four or five optical fibers and has a sufficiently small diametrical size.

According to the present invention, such a digital image sender, a digital image receiver, a digital image transmission system and a digital image transmission method as just described can be implemented by the following measures. In particular, when a digital image signal including image signals for color image reproduction, a reference clock signal and parallel control signals is to be transmitted from a digital image outputting apparatus such as a computer or a video image reproduction apparatus to a digital image inputting apparatus such as a liquid crystal monitor or a projector, a superposition signal wherein a serial control signal converted from the parallel control signals and the reference clock signal are superposed is electro-optically converted so that it is transmitted as an optical signal.

More particularly, according to an embodiment of the present invention, there is provided a digital image sender for transmitting a digital image signal including image signals for color image reproduction, a reference clock signal and parallel control signals, including a parallel/serial converter configured to convert the parallel control signals into a serial control signal by time division multiplexing, a superposition element configured to superpose the serial control signal obtained by the conversion by the parallel/serial converter on the reference clock signal and output a resulting superposition signal, and an electro-optic converter configured to convert the superposition signal outputted from the superposition element from an electric signal into an optical signal.

In the digital image sensor, the parallel/serial converter converts parallel control signals into a serial control signal by time division multiplexing. The superposition element superposes the serial control signal obtained by the conversion by the parallel/serial converter on the reference clock signal and outputs a resulting superposition signal. The electro-optic converter converts the superposition signal outputted from the superposition element from an electric signal into an optical signal.

For example, when a digital image signal including R, G and B image signals is to be transmitted, the R, G and B image signals are transmitted as three parallel image signals obtained by electro-optical conversion thereof while a reference clock signal and parallel control signals are transmitted as one superposition signal obtained by electro-optical conversion thereof. Consequently, the R, G and B image signals, reference clock signal and parallel control signals are transmitted using totaling four optical fibers.

Accordingly, a cable which is composed of optical fibers which are superior in flexibility and has a diametrical size sufficiently smaller than that of a composite cable composed of metal wires and optical fibers can be used for a transmission path. Further, also the number of transmission paths, electro-optical converters and opto-electrical converters can be reduced. Furthermore, since the R, G and B image signals are transmitted as parallel image signals, the apparatus can be implemented using existing less expensive members.

With the digital image sender, since it has the configuration described above, a reference clock signal and parallel control signals can be transmitted as a single superposition signal obtained by electro-optical conversion thereof using a single optical fiber. Consequently, the band utilization efficiency can be raised, and the number of transmission paths, electro-optical converters and opto-electrical converters can be suppressed to the minimum. Besides, since all signals are transmitted by optical transmission, the cable for the transmission can be formed with a reduced diameter when compared with an alternative cable for which metal wires are used, and besides is free from the problem of the EMI.

According to another embodiment of the present invention, there is provided a digital image receiver for receiving a digital image signal, which includes image signals for color image reproduction, a reference clock signal and parallel control signals, in the form of an optical signal produced by electro-optic conversion of a superposition signal wherein a serial control signal converted from the parallel control signals by time division multiplexing and the reference clock signal are superposed, including an opto-electric converter configured to convert the received superposition signal from an optical signal into an electric signal, a separator configured to separate the superposition signal converted by the opto-electric converter into the reference clock signal and the serial control signal, and a serial/parallel converter configured to convert the serial control signal separated by the separator into parallel control signals by time division demultiplexing.

In the digital image receiver, the opto-electric converter converts a received superposition signal from an optical signal into an electric signal. The separator separates the superposition signal converted by the opto-electric converter into a reference clock signal and a serial control signal. The serial/parallel converter converts the serial control signal separated by the separator into parallel control signals by time division demultiplexing.

For example, when a digital image signal including R, G and B image signals is to be received, the R, G and B image signals are received as three parallel image signals obtained by electro-optical conversion thereof. Meanwhile, the reference clock signal and the parallel control signals are received as one superposition signal obtained by electro-optical conversion thereof. Consequently, the R, G and B image signals, reference clock signal and parallel control signals are received from totaling four optical fibers.

Accordingly, a cable which is superior in flexibility and has a sufficiently small diametrical size can be used for a transmission path. Further, also the number of transmission paths, electro-optical converters and opto-electrical converters can be reduced. Furthermore, since the R, G and B image signals are received as parallel image signals, the apparatus can be implemented using existing less expensive members.

With the digital image receiver, since it has the configuration described above, it is possible to opto-electrically convert a superposition signal received through a single optical fiber and extract a reference clock signal and parallel control signals. Consequently, the band utilization efficiency can be raised, and the number of transmission paths, electro-optical converters and opto-electrical converters can be suppressed to the minimum.

According to a further embodiment of the present invention, there is provided a digital image transmission system including a digital image sender which transmits a digital image signal including image signals for color image reproduction, a reference clock signal and parallel control signals, and a digital image receiver which receives the digital image signal from the digital image transmission apparatus, the digital image sender including a parallel/serial converter configured to convert the parallel control signals into a serial control signal by time division multiplexing, a superposition element configured to superpose the serial control signal obtained by the conversion by the parallel/serial converter on the reference clock signal and output a resulting superposition signal, and an electro-optic converter configured to convert the superposition signal outputted from the superposition element from an electric signal into an optical signal, the digital image receiver including an opto-electric converter configured to convert the received superposition signal from an optical signal into an electric signal, a separator configured to separate the superposition signal converted by the opto-electric converter into the reference clock signal and the serial control signal, and a serial/parallel converter configured to convert the serial control signal separated by the separator into parallel control signals by time division demultiplexing.

According to the digital image transmission system, in the digital image sender, the parallel/serial converter converts the parallel control signals into a serial control signal by time division multiplexing. The superposition element superposes the serial control signal obtained by the conversion by the parallel/serial converter on the reference clock signal and outputs a resulting superposition signal. The electro-optic converter converts the superposition signal outputted from the superposition element from an electric signal into an optical signal. In the digital image receiver, the opto-electric converter converts the received superposition signal from an optical signal into an electric signal. The separator separates the superposition signal converted by the opto-electric converter into the reference clock signal and the serial control signal. The serial/parallel converter converts the serial control signal separated by the separator into parallel control signals by time division demultiplexing.

For example, when a digital image signal including R, G and B image signals is to be transmitted, the R, G and B image signals are transmitted as three parallel image signals obtained by electro-optical conversion thereof. Meanwhile, a reference clock signal and parallel control signals are transmitted as one superposition signal obtained by electro-optical conversion thereof. Consequently, the R, G and B image signals, reference clock signal and parallel control signals are transmitted using totaling four optical fibers.

Accordingly, a cable which is superior in flexibility and has a sufficiently small diametrical size can be used for a transmission path. Further, also the number of transmission paths, electro-optical converters and opto-electrical converters can be reduced. Furthermore, since the R, G and B image signals are received as parallel image signals, the apparatus can be implemented using existing less expensive members.

According to a still further embodiment of the present invention, there is provided a digital image transmission method for transmitting a digital image signal including image signals for color image reproduction, a reference clock signal and parallel control signals, including the steps executed on the sender side of the digital image signal of converting the parallel control signals into a serial control signal by time division multiplexing, superposing the serial control signal obtained by the conversion on the reference clock signal, and converting the superposition signal from an electric signal into an optical signal, and the steps executed on the receiver side of the digital image signal of converting the received superposition signal from an optical signal into an electric signal, separating the superposition signal obtained by the conversion into the reference clock signal and the serial control signal, and converting the separated serial control signal into parallel control signals by time division demultiplexing.

According to the digital image transmission method, on the sender side, a superposition signal wherein a serial control signal converted from parallel control signals and a reference clock signal are superposed is converted from an electric signal into an optical signal.

On the receiver side, the superposition signal converted from the optical signal into an electric signal is separated into the reference clock signal and the serial control signal. Then, the separated serial control signal is converted into parallel control signals.

For example, when a digital image signal including R, G and B image signals is to be transmitted, the R, G and B image signals are transmitted as three parallel image signals obtained by electro-optical conversion thereof. Meanwhile, a reference clock signal and parallel control signals are transmitted as one superposition signal obtained by electro-optical conversion thereof. Consequently, the R, G and B image signals, reference clock signal and parallel control signals are transmitted using totaling four optical fibers.

Accordingly, a cable which is superior in flexibility and has a sufficiently small diametrical size can be used for a transmission path.

With the digital image transmission system and the digital image transmission method, since it has the configuration described above, a reference clock signal and parallel control signals can be transmitted as a single superposition signal in the form of an optical signal. Consequently, the band utilization efficiency can be raised, and the number of transmission paths, electro-optical converters and opto-electrical converters can be suppressed to the minimum. Besides, since all signals are transmitted by optical transmission, the cable for the transmission can be formed with a reduced diameter when compared with an alternative cable for which metal wires are used, and besides is free from the problem of the EMI.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

[Embodiment 1]

Figure 1:
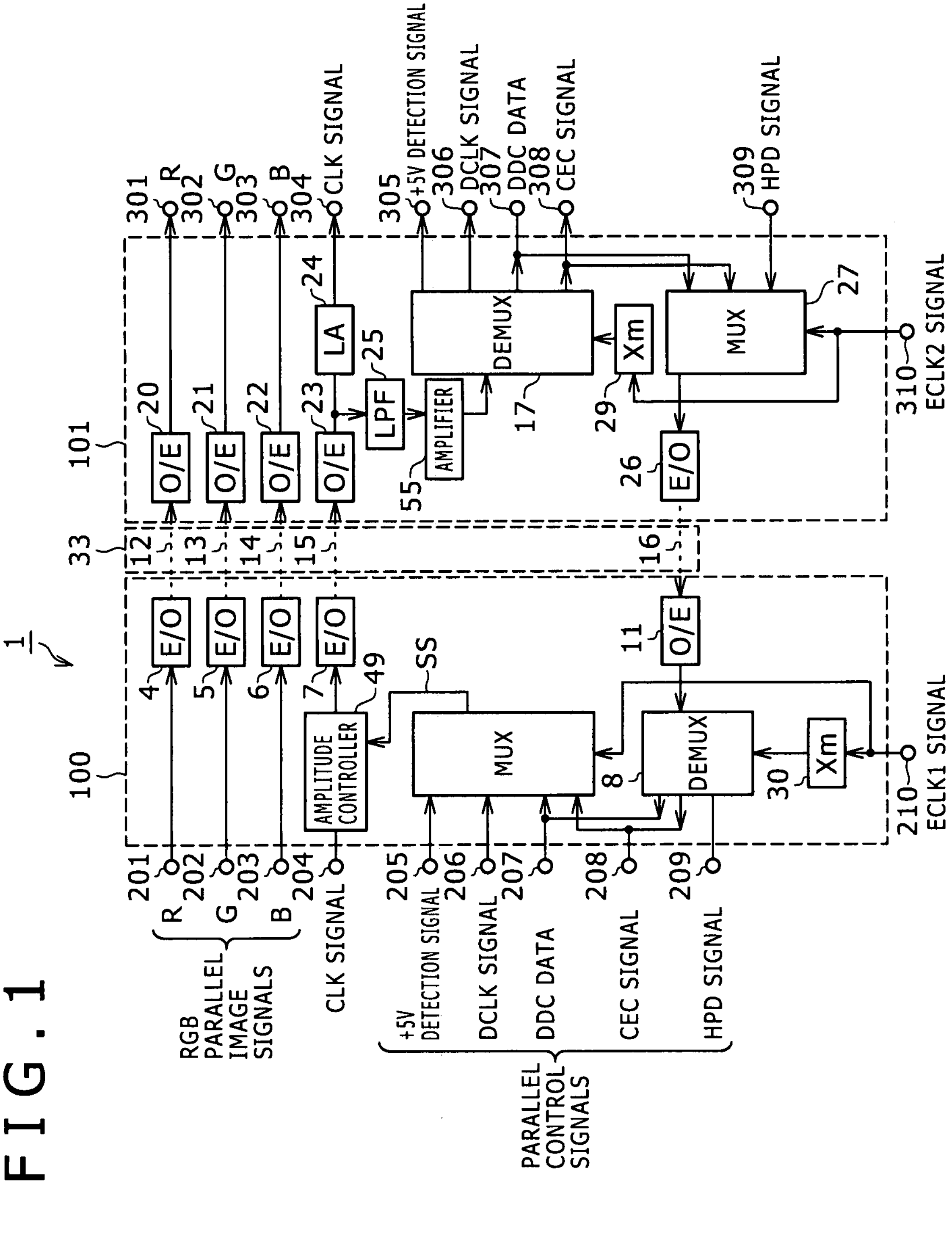
FIG. 1 is a block diagram showing an example of a configuration of a digital image transmission system to which the present invention is applied.

FIG. 1 shows an example of a configuration of a digital image transmission system to which the present invention is applied. Referring to FIG. 1, the digital image transmission system 1 shown forwardly transmits a digital image signal including RGB parallel image signals, a reference clock signal and parallel control signals from a digital image outputting apparatus such as a computer or a video image reproduction apparatus to a digital image inputting apparatus such as a liquid crystal monitor or a projector. The digital image transmission system 1 further has a function of backwardly transmitting parallel control signals from the digital image inputting apparatus to the digital image outputting apparatus.

The digital image transmission system 1 includes an image sender 100 for transmitting a digital image signal, and an image receiver 101 for receiving the digital image signal from the image sender 100. An optical fiber cable 33 including five optical fibers 12 to 16 is used as a transmission path between the image sender 100 and the image receiver 101.

The image sender 100 includes electro-optic converter (E/o) circuits 4 to 7, a multiplexer (MUX) circuit 3, a demultiplexer (DEMUX) circuit 8, an m-fold multiplier (denoted by ×m in FIG. 1) 30, an opto-electric converter (O/E) circuit 11, an amplitude controller 49, and ten terminals 201 to 210.

RGB parallel image signals transmitted downwardly are inputted to the terminals 201 to 203. The E/O circuit 4 for the R color which forms an example of an electro-optic converter is connected to the terminal 201, performs electro-optic conversion of an image signal for the R color into an optical signal and outputs the optical signal. The optical fiber 12 for the R color is connected to the E/O circuit 4 and transmits an optical signal for the R color produced by the electro-optic conversion. The E/O circuit 5 for the G color which forms an example of the electro-optic converter is connected to the terminal 202, performs electro-optic conversion of an image signal for the G color into an optical signal and outputs the optical signal. The optical fiber 13 for the G color is connected to the E/O circuit 5 and transmits an optical signal for the G color produced by the electro-optic conversion. The E/O circuit 6 for the B color which forms an example of the electro-optic converter is connected to the terminal 203, performs electro-optic conversion of an image signal for the B color into an optical signal and outputs the optical signal. The optical fiber 14 for the B color is connected to the E/O circuit 6 and transmits an optical signal for the B color produced the by electro-optic conversion. Consequently, RGB parallel image signals are electro-optically converted for each channel and transmitted through the optical fibers 12 to 14, respectively.

A reference clock signal (hereinafter referred to as CLK signal) is inputted to the terminal 204. The MUX circuit 3 which forms an example of a parallel/serial converter is connected to the terminals 205 to 208 and receives, at the terminals 205 to 208 thereof, parallel control signals such as a DDC CLK signal (Data Display Channel Clock signal, hereinafter referred to as DCLK signal), DDC DATA (Data Display Channel DATA, hereinafter referred to as DDC data) and a CEC (Consumer Electronics Control signal, hereinafter referred to as CEC signal) and a +5V detection signal. Then, the MUX circuit 3 performs time division multiplexing of the parallel control signals based on an external clock signal (External CLK1, hereinafter referred to as ECLK1 signal) to parallel/serial convert the parallel control signals into a serial control signal SS. The MUX circuit 3 outputs the serial control signal SS. The ECLK1 signal is supplied through the terminal 210.

The +5V detection signal is inputted to the terminal 205 and used to transmit power supply information. The DDC data is inputted to the terminal 207 and used to transmit a unique signal of a computer or a liquid crystal monitor. The unique signal is information for identifying what computer or liquid crystal monitor is connected. The DCLK signal is inputted to the terminal 206 and used to fetch the DDC data in synchronism. The CEC signal is inputted to the terminal 208 and used to control an interaction between different apparatus.

It is to be noted that the MUX circuit 3 includes a frame identifier appending section not shown and appends a frame identifier FI, which is used to establish frame synchronism on the receiver side, to the serial control signal SS.

The amplitude controller 49 which forms an example of an amplitude controller is connected to the MUX circuit 3 and the terminal 204 and receives a CLK signal inputted to the terminal 204 and the serial control signal SS. The amplitude controller 49 thus compares the CLK signal and the serial control signal SS with each other. The amplitude controller 49 in the present embodiment controls so that the amplitude of the CLK signal is greater than the amplitude of the serial control signal SS. The E/O circuit 7 which forms an example of a superposition element and the electro-optic converter 23 are connected to the amplitude controller 49. The E/O circuit 7 electro-optically converts the serial control signal SS from the amplitude controller 49 in a superposed relationship with the CLK signal and outputs a resulting optical signal. The optical fiber 15 for the superposition signal is connected to the E/O circuit 7 such that the E/O circuit 7 transmits the optical signal of the serial control signal SS+CLK signal obtained by the electro-optic conversion therethrough. The image sender 100 having a forward signal transmission system for a digital image signal is configured in such a manner as described above.

Meanwhile, the image sender 100 includes the O/E circuit 11, m-fold multiplier 30 and DEMUX circuit 8 as a backward signal receiver system in addition to the forward signal transmission system.

The optical fiber 16 from the image receiver is connected to the O/E circuit 11. The O/E circuit 11 opto-electrically converts a serial optical signal for backward control sent from the image receiver and outputs a resulting signal as a backward serial control signal. The serial backward control optical signal is produced by parallel/serial conversion and electro-optic conversion of backward parallel control signals on the receiver side.

The m-fold multiplier 30 is connected to the terminal 210 and magnifies the ECLK1 signal supplied from the terminal 210 to m times. The DEMUX circuit 8 is connected to the m-fold multiplier 30 and the O/E circuit 11 and serial/parallel converts a backward serial control signal outputted from the O/E circuit 11 based on the ECLK1 signal magnified to m times to obtain parallel control signals. The DEMUX circuit 8 outputs the parallel control signals. In the digital image transmission system 1 shown in FIG. 1, the DEMUX circuit 8 includes a decoding processor and a frame synchronization processor not shown. The decoding processor decodes a signal Manchester encoded upon transmission, and the frame synchronization processor executes a frame synchronization process based on a frame identifier appended upon transmission to perform serial/parallel conversion of the decoded signal. The DEMUX circuit 8 time division demultiplexes parallel control signals to extract DDC data, a CEC signal and an HPD (Hot Plug Detector) signal. The HPD signal is outputted to the terminal 209. The terminal 209 is connected, for example, to a transmission processor not shown. The image sender 100 having a backward signal receiver system for a digital image signal is configured in this manner.

The image receiver 101 includes opto-electric converter (O/E) circuits 20 to 23, a DEMUX circuit 17, a limiting amplifier (LA) circuit 24, a low-pass filter (LPF) circuit 25, an amplifier 55, an m-fold multiplier 29, a MUX circuit 27, an E/O circuit 26 and ten terminals 301 to 310.

RGB parallel image signals transmitted forwardly are inputted to the image receiver 101. The RGB parallel image signals are transmitted through the optical fibers 12 to 14 connected to the image sender 100.

The O/E circuit 20 for the R color which forms an example of an opto-electric converter is connected to the optical fiber 12, performs opto-electric conversion of an image signal for the R color into an optical signal and outputs the electric signal. The terminal 301 is connected to the O/E circuit 20 and outputs an optical signal for the R color produced by the opto-electric conversion. The O/E circuit 21 for the G color which forms an example of the opto-electric converter is connected to the optical fiber 13, performs opto-electric conversion of an image signal for the G color into an optical signal and outputs the electric signal. The terminal 302 is connected to the O/E circuit 21 and outputs an optical signal for the G color produced by the opto-electric conversion. The O/E circuit 22 for the B color which forms an example of the opto-electric converter is connected to the optical fiber 14, performs opto-electric conversion of an image signal for the B color into an optical signal and outputs the electric signal. The terminal 303 is connected to the O/E circuit 22 and outputs an optical signal for the B color produced by the opto-electric conversion. Consequently, the RGB parallel image signals are opto-electrically converted for each channel and outputted from the terminals 301 to 303.

A superposition signal of a serial control signal SS+CLK signal transmitted forwardly is inputted to the image receiver 101. The superposition signal of the serial control signal SS+CLK signal is transmitted through the optical fiber 15 connected to the image sender 100.

The O/E circuit 23 is connected to the optical fiber 15 and opto-electrically converts the superposition signal of the serial control signal SS+CLK signal. The LA circuit 24 which forms an example of a first signal extractor serving as a separator is connected to the O/E circuit 23 and separates the serial control signal SS from the superposition signal to extract the CLK signal. The terminal 304 is connected to the LA circuit 24 and outputs the extracted CLK signal. The outputted CLK signal is used to input RGB parallel image signals in synchronism.

Meanwhile, the LPF circuit 25 which forms an example of a second signal extractor serving as a separator is connected to the O/E circuit 23, and separates the CLK signal from the superposition signal to extract the serial control signal SS. The amplifier 55 which forms an example of a second waveform adjustor is connected at a next stage to the LPF circuit 25 and amplifies or shapes the separated serial control signal SS to a necessary amplification level. The DEMUX circuit 17 which forms an example of a serial/parallel converter is connected to the amplifier 55 and receives an amplified or shaped serial control signal SS. The DEMUX circuit 17 performs time division multiplexing of the serial control signal SS inputted thereto based on an ECLK2' signal to perform serial/parallel conversion of the serial control signal SS. It is to be noted that the ECLK2' signal is formed by magnifying the ECLK2 signal of a frequency equal to that of the ECLK1 signal on the transmission side and supplied from the m-fold multiplier 29 connected to the DEMUX circuit 17 to m times. The ECLK2 signal is inputted through the terminal 310.

The DEMUX circuit 17 includes the frame synchronization processor not shown and executes a frame synchronization process based on a frame identifier appended upon transmission to perform serial/parallel conversion.

The terminals 305 to 308 are connected to the DEMUX circuit 17 so that parallel control signals obtained by serial/parallel conversion are outputted therethrough. The +5 V detection signal is outputted through the terminal 305, and the DDC data is outputted from the terminal 307. Further, the DCLK signal is outputted from the terminal 306, and the CEC signal is outputted from the terminal 308. In the digital image transmission system 1 shown in FIG. 1, the parallel control signals outputted from the terminals 305 to 308 are inputted to a reception processor not shown. The image receiver 101 having a forward signal reception system for a digital image signal is configured in such a manner as described above.

The image receiver 101 includes the MUX circuit 27, E/O circuit 26 and terminals 307 to 310 as a backward signal transmission system in addition to the forward signal reception system.

The MUX circuit 27 is connected to the terminals 307 to 309 such that forward control signals received by the reception processor not shown, that is, the DDC data, CEC signal and HPD signal, are inputted through them, respectively. The MUX circuit 27 is connected to the terminal 310 such that an ECLK2 signal is inputted through the same. The MUX circuit 27 uses the ECLK2 signal to perform time division multiplexing of backward parallel control signals thereby to perform parallel/serial conversion of the backward parallel control signals and outputs a resulting backward serial control signal. In the digital image transmission system 1 shown in FIG. 1, the MUX circuit 27 includes a code conversion processor and the frame identifier appending section not shown. The code conversion processor performs Manchester encoding in order to remove one-sidedness of codes, and the frame identifier appending section appends a frame identifier FI to be used in frame synchronization on the receiver side. The E/O circuit 26 is connected to the MUX circuit 27 and electro-optically converts the backward serial control signal from the MUX circuit 27. The optical fiber 16 is connected to the E/O circuit 26 such that it transmits an optical signal produced by electro-optic conversion therethrough. The image receiver 101 having a backward signal transmission system for a digital image signal is formed in this manner.

Now, an example of a configuration of the E/O circuit 7, O/E circuit 23 and associated elements which relate to superposition transmission of the CLK signal and the serial control signal SS is described.

Figure 2:
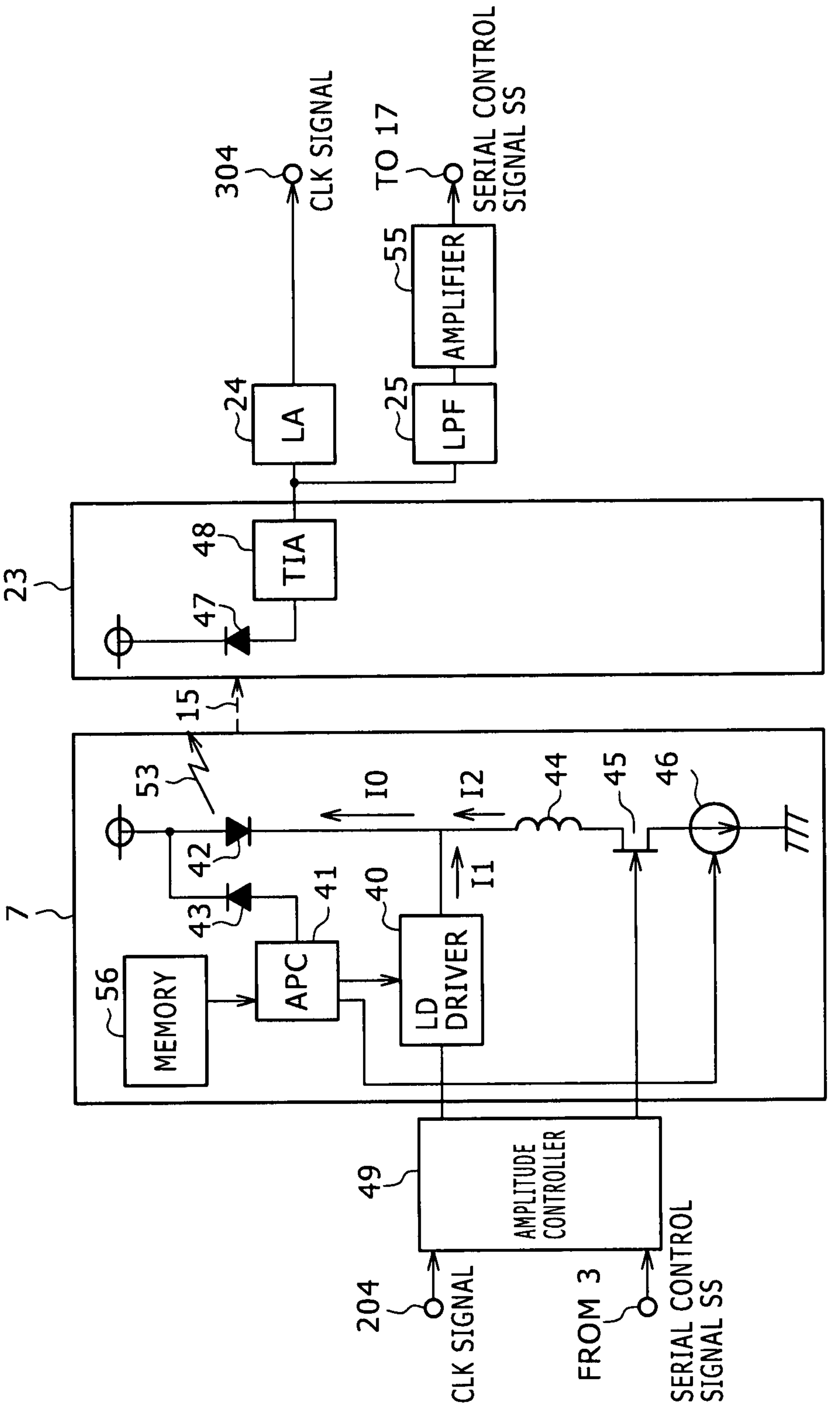
FIG. 2 is a block diagram showing an example of a configuration of an E/O circuit and an O/E circuit as well as associated elements of the digital image transmission system.

FIG. 2 shows an example of a configuration of the E/O circuit 7, O/E circuit 23 and associated elements. Referring to FIG. 2, the E/O circuit 7 shown includes a laser diode (LD) driver 40, an auto power control (APC) circuit 41, a laser diode (LD) element 42, a monitor photo-diode (MPD) element 43, a coil 44, a field effect transistor (FET) element 45, a current source 46, and a memory 56.

The amplitude controller 49 is provided at a stage preceding to the E/O circuit 7. The terminal 204 and the MUX circuit 3 are connected to the amplitude controller 49. The CLK signal is inputted from the terminal 204 and the serial control signal SS is inputted from the MUX circuit 3 to the amplitude controller 49. The amplitude controller 49 compares in amplitude between the CLK signal and the serial control signal SS inputted thereto and controls so that the amplitude of the CLK signal becomes, for example, three times that of the serial control signal SS. The LD driver 40 is connected to the amplitude controller 49 such that the CLK signal having a controlled amplitude is inputted to the LD driver 40. The LD driver 40 performs voltage/current conversion of the CLK signal and outputs a resulting current output I1.

Meanwhile, the FET element 45 is connected to the amplitude controller 49 such that the serial control signal SS having a controlled amplitude is inputted to the gate of the FET element 45. The FET element 45 thus performs voltage/current conversion of the serial control signal SS and outputs a resulting current output I2 through the coil 44. The LD driver 40 and the coil 44 are connected to the LD element 42. The LD element 42 is driven by driving current input I0 produced by superposition of the current output I1 and the current output I2 and outputs an optical signal 53. The optical signal 53 is transmitted to the image receiver 101 through the optical fiber 15. The E/O circuit 7 which transmits the superposition signal of the CLK signal and the serial control signal SS through the optical fiber 15 is configured in this manner.

While the optical signal 53 is transmitted to the receiver side, it is received also by the MPD element 43, and the light amount thereof is controlled by the APC circuit 41. The MPD element 43 is disposed so as to receive the optical signal 53 and outputs a current signal obtained by opto-electric conversion of the optical signal 53. The APC circuit 41 which forms an example of a light amount controller is connected to the MPD element 43, and supervises the current output of the MPD element 43 and outputs a control signal for controlling the light amount. The current source 46 is connected to the APC circuit 41 such that the current value is controlled in response to a control signal from the APC circuit 41. The current source 46 is connected to the LD element 42 through the FET element 45 and the coil 44 and controls offset current of the LD element 42. In the E/O circuit 7 shown in FIG. 2, the APC circuit 41 is set such that the control loop constant of the APC circuit 41 is sufficiently lower than the frequency of the coil 44 so as not to follow up the variation of the serial control signal SS to be inputted to the E/O circuit 7. This is because, if the loop constant of the APC circuit 41 is high, then the control signal outputted from the APC circuit 41 to the current source 46 follows up the variation of the O/E circuit 22 to oscillate, resulting in failure of the light amount control.

The APC circuit 41 further has a function of outputting a control signal to the LD driver 40 to control the ratio between the amplitude of the CLK signal and the serial control signal SS. A coefficient to be used in the control is set using a fixed arithmetic operation expression or set to a value read out from the memory 56. The E/O circuit 7 for controlling the light amount of the LD element 42 is configured in this manner.

The O/E circuit 23 on the receiver side includes a photodiode (PD) element 47 and a transimpedance amplifier (TIA) circuit 48. The PD element 47 is disposed so as to receive the optical signal 53 from the optical fiber 15 and performs light/current conversion of the optical signal 53. The TIA circuit 48 is connected to the PD element 47 and converts a current signal produced by optical/current conversion by the PD element 47 into a voltage signal having a fixed amplitude. The LA circuit 24 which forms an example of the first signal extractor is connected to the TIA circuit 48 and extracts the CLK signal from the opto-electrically conversed superposition signal. The terminal 304 is connected to the LA circuit 24 and outputs the extracted CLK signal.

Meanwhile, the LPF circuit 25 which forms an example of the second signal extractor is connected to the TIA circuit 48 and extracts the serial control signal SS from the opto-electrically converted superposition signal. The amplifier 55 which forms an example of the second waveform adjustor is connected to the LPF circuit 25 and amplifies or shapes the extracted serial control signal SS to a required amplification level. The DEMUX circuit 17 is connected to the amplifier 55 such that the serial control signal SS having the controlled amplification level is inputted to the amplifier 55. The O/E circuit 23 which separates the received superposition signal into the CLK signal and the serial control signal SS and outputs the CLK signal and the serial control signal SS to the terminal 304 and the DEMUX circuit 17, respectively, is configured in this manner.

Figures 3A, 3B, 3C, 3D, 3E, 3F, 3G:
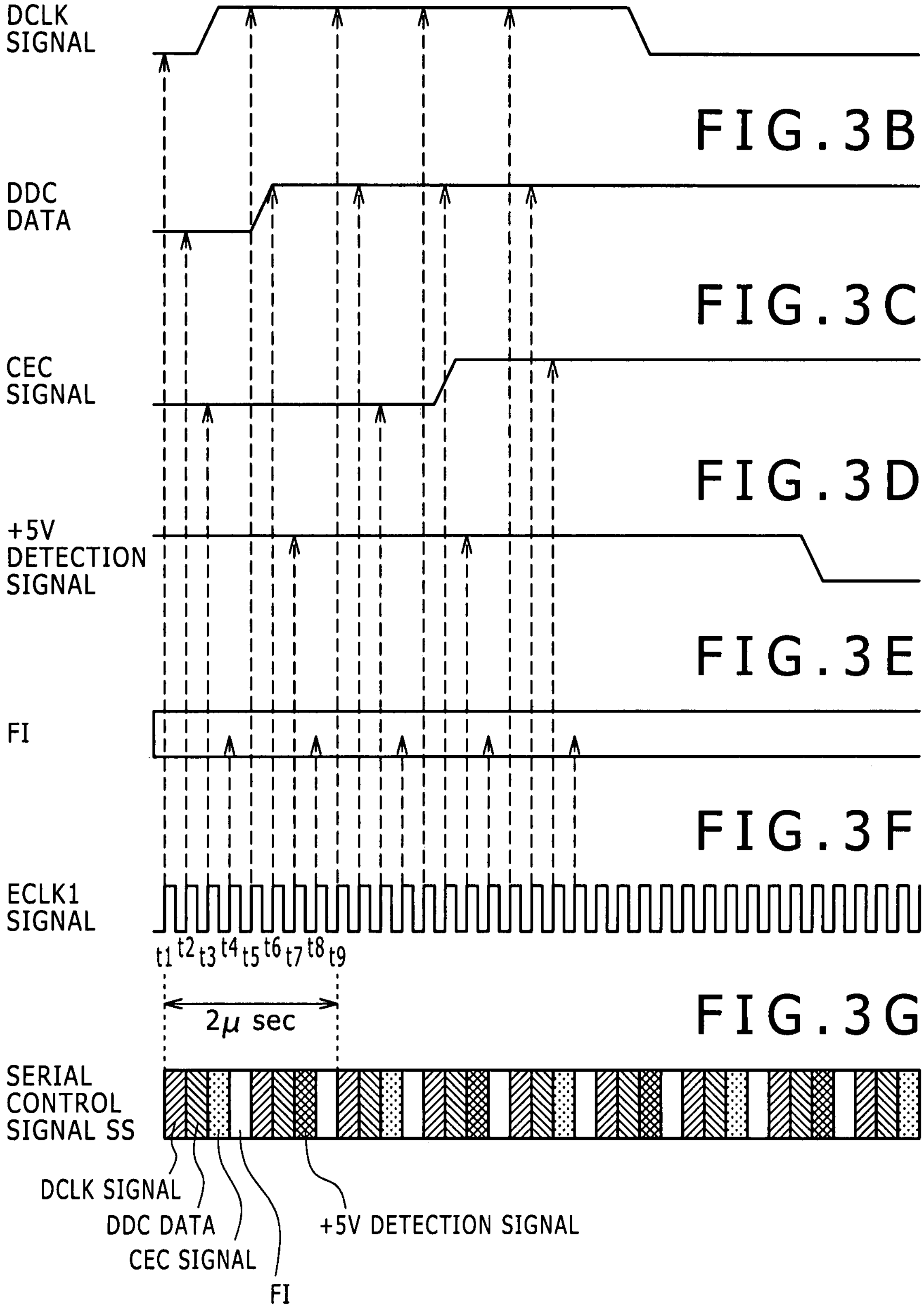
FIGS. 3A to 3G are timing charts illustrating an example of parallel/serial conversion of parallel control signals in the digital image transmission system.

FIGS. 3A to 3G are timing charts illustrating an example of parallel/serial conversion of parallel control signals. In FIGS. 3A to 3G, the DCLK signal, DDC data, CEC signal and +5 V detection signal which are parallel control signals are parallel/serial converted by time division multiplexing so that they can be integrated, synthesized or multiplexed into the single serial control signal SS. The time division multiplexing is performed using the ECLK1 signal which is an external reference clock signal. In FIG. 3F, the ECLK1 signal is set to a frequency of 4 MHz.

Further, in FIGS. 3A to 3G, a frame identifier FI used upon frame synchronization on the receiver side is appended on the sender side.

In the example of FIGS. 3A to 3G, the DCLK signal of FIG. 3A is latched between rising time t1 and next rising time t2 of the ECLK1 signal of FIG. 3F, and the value between times t1 and t2 is read out and written as a value between times t1 and t2 of the serial control signal SS of FIG. 3G. The DDC data of FIG. 3B is latched between rising time t2 and next rising time t3 of the ECLK1 signal of FIG. 3B, and the value between times t2 and t3 is read out and written as a value between times t2 and t3 of the O/E circuit 22 of FIG. 3G. The CEC signal of FIG. 3C is latched between rising time t3 of the ECLK1 signal of FIG. 3F and next rising time t4 is latched, and the value between times t3 and t4 is read out and written as a value between times t3 and t4 of the serial control signal SS of FIG. 3G. The waveform of the FI identifier of FIG. 3E is read out between rising time t4 and next rising time t5 of the ECLK1 signal of FIG. 3F is read out and written as a waveform between times t4 and t5 of the serial control signal SS. The DCLK signal of FIG. 3A is latched between rising time t5 and rising time t6 of the ECLK1 signal of FIG. 3F, and the value between times t5 and t6 is read out and written as a value between times t5 and t6 of the serial control signal SS of FIG. 3G. The DDC data of FIG. 3B is latched between rising time t6 and next rising time t7 of the ECLK1 signal of FIG. 3F is latched, and the value between times t6 and t7 is read out and written as a value between times t6 and t7 of the O/E circuit 22 of FIG. 3G. The +5 V detection signal of FIG. 3D is latched between rising time t7 and next rising time t8 of the ECLK1 signal of FIG. 3F, and the value between times t7 and t8 is read out and written as a value between times t7 and t8 of the serial control signal SS of FIG. 3G. The waveform of the FI identifier of FIG. 3E is readout between rising time t8 and next rising time t9 of the ECLK1 signal of FIG. 3F and is written as a waveform between times t8 and t9 of the O/E circuit 22 of FIG. 3G.

In this manner, the parallel control signals are successively written into the serial control signal SS with a frame identifier FI appended thereto in a period of 8 bits/2 μsec. In the example of FIGS. 3A to 3G, the DCLK signal and the DDC data of a comparatively high rate are written twice in one cycle, and the CEC signal and the +5 V detection signal of a comparatively low rate are written once in one cycle while the frame identifier FI is appended twice in one cycle. In this manner, the parallel control signals are integrated into the serial control signal SS as a single signal.

Figure 4A:
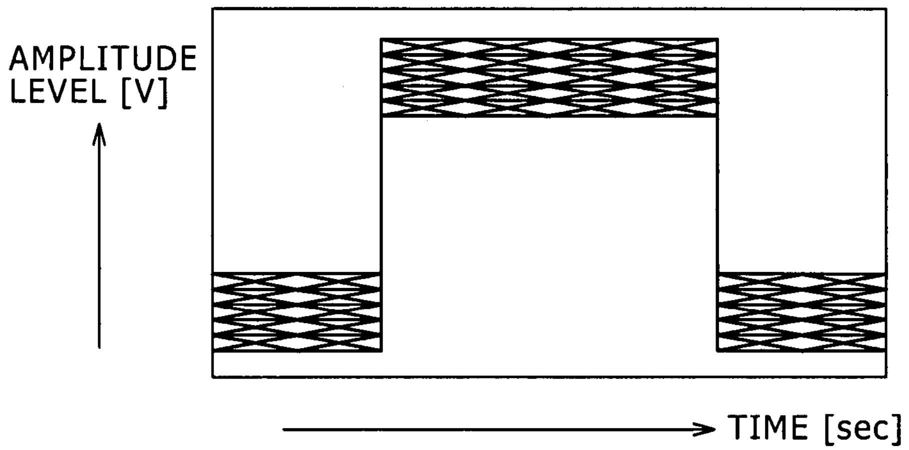
FIGS. 4A to 4C are waveform diagrams illustrating a waveform of a superposition signal, a CLK signal and a serial control signal used in the digital image transmission system.
Figure 4B:
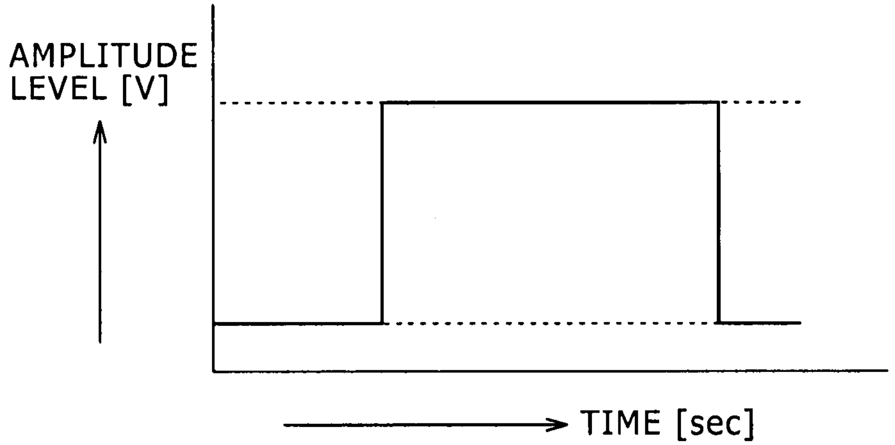
Figure 4C:
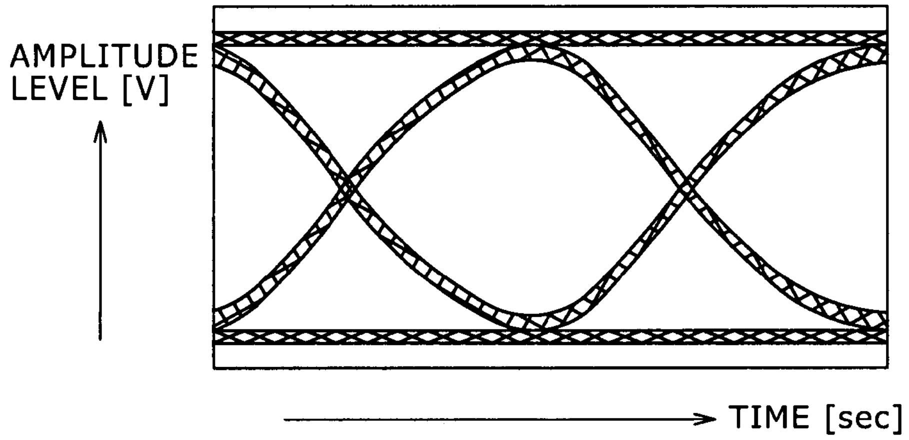

Now, an example of the waveform of the superposition signal of the serial control signal SS+CLK signal is described. FIGS. 4A, 4B and 4C illustrate an example of the waveform of the superposition signal, CLK signal and serial control signal SS in the digital image transmission system 1 according to the first embodiment of the present invention, respectively.

In FIGS. 4A, 4B and 4C, the axis of abscissa indicates the time, and the axis of ordinate indicates the amplitude level. FIG. 4A illustrates an example of the waveform of the superposition signal of the CLK signal and the serial control signal SS. The waveform indicates a plurality of superposition signals in an overlapping relationship with each other. In the first embodiment of the present invention, the superposition signal of the waveform illustrated in FIG. 4A can be observed as an output signal of the O/E circuit 23 on the receiver side.

FIG. 4B illustrates an example of the waveform of the CLK signal obtained by taking out the serial control signal SS from the superposition signal. In the first embodiment, the CLK signal of the waveform illustrated in FIG. 4B can be extracted by amplitude limiting and amplifying the superposition signal of the waveform illustrated in FIG. 4A by means of the LA circuit 24.

FIG. 4C illustrates an example of the waveform of the serial control signal SS extracted by taking out the CLK signal from the superposition signal. This waveform indicates a plurality of serial control signals SS in an overlapping relationship with each other. In the first embodiment, the serial control signal SS of the waveform illustrated in FIG. 4C is extracted by taking out low frequency components from the superposition signal of the waveform illustrated in FIG. 4A by means of the LPF circuit 25.

In the following, an example of operation of the digital image transmission system 1 which executes a digital image transmission method according to the first embodiment of the present invention is described.

In the operation example, the digital image transmission system 1 forwardly transmits a digital image signal including RGB parallel image signals, a reference clock signal and parallel control signals from the image sender 100 to the image receiver 101. Further, the digital image transmission system 1 backwardly transmits parallel control signals from the image receiver 101 to the image sender 100. Accordingly, in the following, the operation example is described separately between forward transmission and backward transmission.

It is to be noted that description of the operation in forward transmission of RGB parallel image signals is omitted here because such forward transmission depends merely upon parallel transmission.

Figure 5:
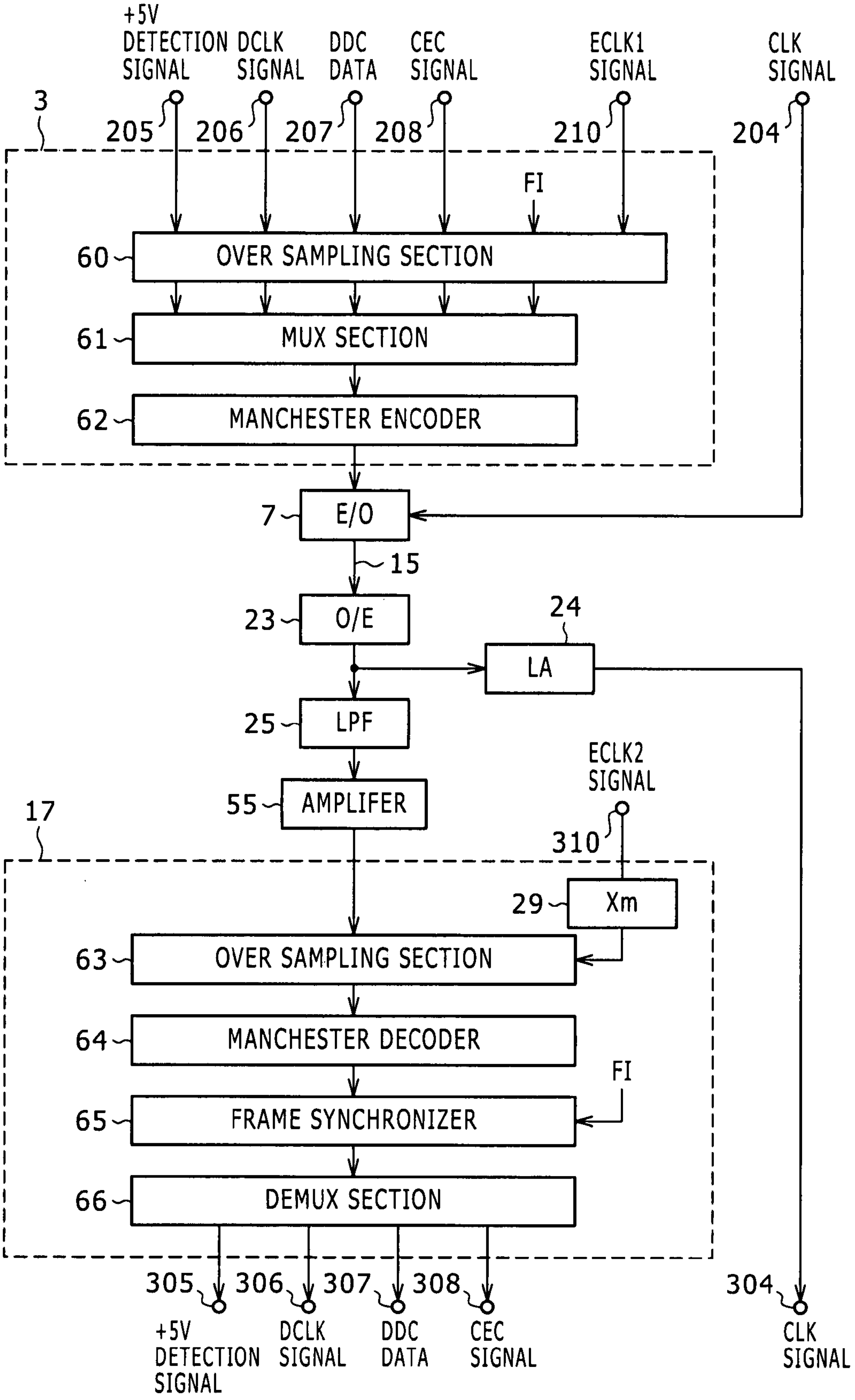
FIG. 5 is a block diagram illustrating an example of operation of the digital image transmission system.

FIG. 5 illustrates an example of operation of the digital image transmission system 1. In the following, forward transmission of the parallel control signals and the CLK signal is described with reference to FIG. 5.

[Forward Transmission]

In the sender section, parallel control signals inputted through the terminals 205 to 208, that is, the +5 V detection signal, DCLK signal, DDC data and CEC signal, are inputted to an oversampling section 60 of the MUX circuit 3. The values of the parallel control signals at rising times ta (a=1 to 8) of the ECLK1 signal are read out successively by the oversampling section 60 and inputted to a MUX section 61. Here, the ECLK1 signal is an external clock signal inputted through the terminal 210. The parallel control signals thus read out are written as values between times ta and t(a+1) into a serial control signal SS by the MUX section 61. Thereupon, a frame identifier FI from the frame identifier appending section of the MUX circuit 3 not shown is appended to the serial control signal SS, for example, twice in one cycle. Thereafter, the serial control signal SS is inputted to a Manchester encoder 62, by which it is Manchester encoded in order to keep code balance of the serial control signal. The Manchester encoded serial control signal SS is inputted to the E/O circuit 7, by which it is superposed on the CLK signal and then electro-optically converted. The CLK signal is inputted through the terminal 204.

The optical signal for the serial control signal SS+CLK signal obtained by the electro-optic conversion in this manner is transmitted through the optical fiber 15.

In the receiver section, the optical signal of the serial control signal SS+CLK signal transmitted through the optical fiber 15 is received and opto-electrically converted by the O/E circuit 23 on the receiver side. The opto-electrically converted superposition signal is inputted to the LPF circuit 25 and the LA circuit 24. From the superposition signal inputted to the LPF circuit 25, low frequency components are taken out to extract the serial control signal SS separated from the CLK signal. The extracted serial control signal SS is inputted to the amplifier 55, by which the waveform thereof is amplified or shaped. The serial control signal SS having the shaped waveform is inputted to an oversampling section 63 of the DEMUX circuit 17, by which it is oversampled using an ECLK2' signal. The ECLK2' signal here is produced by magnifying the ECLK2 signal having a frequency equal to that of the ECLK1 signal on the sender side to m times. The ECLK2 signal is inputted through the terminal 310. The oversampled serial control signal is inputted to a Manchester decoder 64, by which it is Manchester decoded. The Manchester decoded serial control signal is inputted to a frame synchronizer 65, by which the frame identifier FI appended upon transmission is detected. After the frame identifier detection, the serial control signal SS is inputted to a DEMUX section 66, by which it is serial/parallel converted by time division multiplexing to extract parallel control signals such as the DCLK signal, DDC data, CEC signal and +5 V detection signal. The extracted parallel control signals are outputted through the terminals 305 to 308.

On the other hand, the superposition signal inputted to the LA circuit 24 is amplitude limited and amplified to extract the CLK signal separate from the serial control signal SS. The extracted CLK signal is outputted through the terminal 304. Forward transmission of the parallel control signals and the CLK signal is performed in this manner.

[Backward Transmission]

In the following, transmission of backward parallel control signals from the receiver section to the sender section is described.

Referring to FIG. 1, in the image receiver 101, backward parallel control signals (DDC data, a CEC signal and an HPD signal) from the reception processor are inputted to the MUX circuit 27 through the respective terminals. The parallel control signals are subject to parallel/serial conversion by time division multiplexing based on the ECLK2 signal by the MUX circuit 27 and are written into a serial control signal. The ECLK2 signal here is provided to the MUX circuit 27 from the outside. In the present example, a frame identifier FI from the frame identifier appending section of the MUX circuit 27 is appended to the backward serial control signal. Thereafter, the backward serial control signal is inputted to the E/O circuit 26, by which it is subject to electro-optic conversion. Then, the backward serial control signal in the form of an optical signal is transmitted through the optical fiber 16.

In the image sender 100, the backward serial control signal transmitted through the optical fiber 16 is received by the O/E circuit 11, by which it is subject to opto-electric conversion. The backward serial control signal in the form of an electric signal is inputted to the DEMUX circuit 8. The backward serial control signal inputted to the DEMUX circuit 8 is subject to serial/parallel conversion based on an ECLK1' signal. The ECLK1' signal here is produced by magnifying the ECLK1 signal provided from the outside to m times. The frequency of the ECLK1 signal is set equal to that of the ECLK2 signal. By the serial/parallel conversion by the DEMUX circuit 8, the backward serial control signal is converted into original parallel control signals, that is, DDC data, a CEC signal and an HPD signal. The resulting parallel control signals are outputted to the transmission processor through the respective terminals. Further, the serial/parallel conversion is performed such that the frame identifier, FI appended by the receiver section is detected to establish synchronism. The backward parallel control signals are transmitted in this manner.

Figure 6:
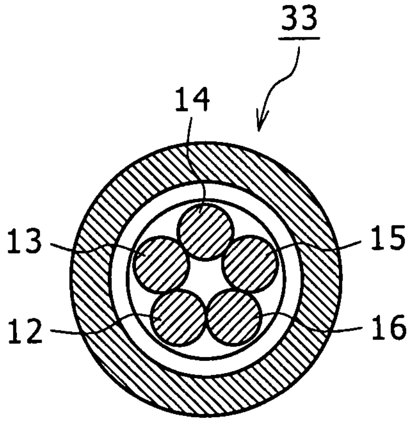
FIG. 6 is a cross sectional view showing an example of a configuration of an optical fiber cable used in the digital image transmission system.

FIG. 6 shows in cross section an example of a configuration of the optical fiber cable 33 used in the digital image transmission system 1 according to the first embodiment.

Figure 10:
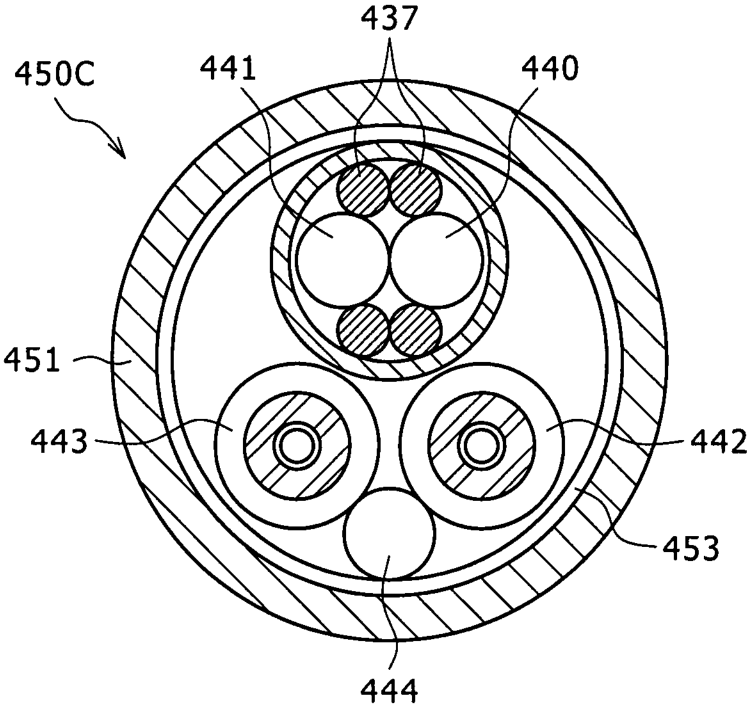
FIG. 10 is a cross sectional view of a composite cable used together with the digital video signal interface module of FIG. 9.

Referring to FIG. 6, the optical fiber cable 33 shown includes five optical fibers 12 to 16. The RGB parallel image signals described hereinabove are transmitted backwardly through the optical fibers 12 to 14, and the superposition signal of the serial control signal SS+CLK signal is transmitted backwardly through the optical fiber 15 while the backward serial control signal is transmitted backwardly through the optical fiber 16. Since the optical fiber cable 33 is formed only from optical fibers, there is no necessity for the coating against the EMI. Consequently, effects higher than those achieved by reduction of transmission paths can be anticipated. In the example of FIG. 6, the radial dimension can be reduced to approximately one half that of the composite cable 450 described hereinabove with reference to FIG. 10.

In this manner, with the digital image transmission system and the digital image transmission method according to the first embodiment of the present invention, the image sender 100 and the image receiver 101 are provided such that, when a digital image signal composed of R, G and B image signals, a CLK signal and parallel control signals is to be transmitted, the CLK signal and the parallel control signals are superposed and transmitted through the single optical fiber 15. Consequently, totaling four to five optical fiber cables are used for the transmission. Accordingly, it is possible to raise the band utilization efficiency and suppress the number of transmission paths, E/O circuits and O/E circuits to a minimum number. Besides, since light is used fully for the transmission, the cables can be formed with a reduced thickness when compared with those wherein metal wires are used, and the problem of the EMI does not occur.

Further, with the image sender 100 in the first embodiment, the amplitude controller 49 is provided at a stage preceding to the E/O circuit 7 and controls so that the amplitude of the CLK signal becomes greater than that of the serial control signal SS. Accordingly, by superposing the CLK signal and the serial control signal SS on each other after the difference in amplitude between the CLK signal and the serial control signal SS is increased on the transmission side, edge detection can be performed with a high degree of accuracy on the receiver side using the LA circuit 24. Consequently, the CLK signal can be extracted readily from the superposition signal.

[Embodiment 2]

Figure 7:
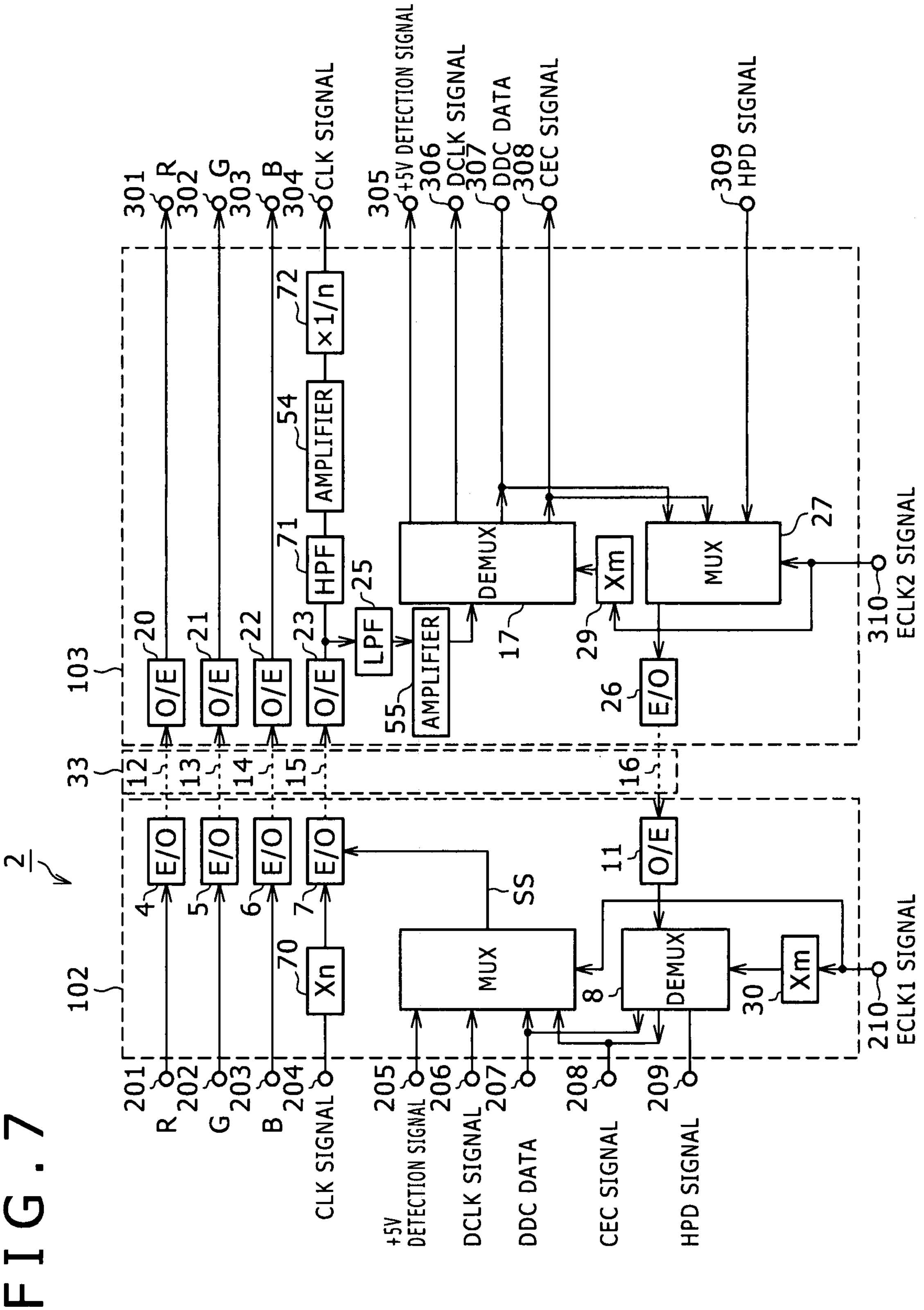
FIG. 7 is a block diagram showing an example of a configuration of another digital image transmission system to which the present invention is applied.

FIG. 7 shows an example of a configuration of another digital image transmission system to which the present invention is applied. Referring to FIG. 7, the digital image transmission system 2 shown includes an image sender 102 for transmitting a digital image signal and an image receiver 103. The digital image transmission system 2 further includes an optical fiber cable 33 including five optical fibers 12 to 16 as a transmission path between the image sender 102 and the image receiver 103.

The image sender 102 is similar to but different from the image sender 100 of the digital image transmission system 1 described hereinabove in that it does not include the amplitude controller 49 of the image sender 100 but includes an n-fold multiplier 70. Meanwhile, the image receiver 103 is similar to but different from the image receiver 101 of the digital image transmission system 1 described hereinabove in that it includes a high-pass filter (HPF) circuit 71 in place of the LA circuit 24 of the image receiver 101 and additionally includes an amplifier 54 and a 1/n-fold multiplier 72.

On the sender side, the n-fold multiplier 70 (denoted by ×n in FIG. 7) which forms an example of a multiplier is connected to the terminal 204 and magnifies the frequency of the CLK signal inputted through the terminal 204 to n times. The E/O circuit 7 is connected to the n-fold multiplier 70 and superposes the serial control signal SS from the MUX circuit 3 on the CLK signal magnified to n times (such CLK signal is hereinafter referred to as n-fold CLK signal). Then, the E/O circuit 7 performs electro-optic conversion of the superposition signal into an optical signal and outputs the optical signal. The optical fiber 15 is connected to the E/O circuit 7 and transmits the optical signal for the serial control signal SS+n-fold CLK signal therethrough.

On the receiver side, the O/E circuit 23 is connected to the optical fiber 15 and performs opto-electric conversion of the superposition signal of the serial control signal SS+n-fold CLK signal. The HPF circuit 71 which forms an example of the first signal extractor is connected to the O/E circuit 23 and takes out high frequency components of the superposition signal to extract the n-fold CLK signal. The amplifier 54 which forms an example of a first waveform adjustor is connected to the HPF circuit 71 and amplifies or shapes the extracted n-fold CLK signal. The amplifier 54 is connected to the 1/n-fold multiplier 72 (denoted by ×1/n in FIG. 7) which forms an example of the multiplier and reduces the extracted n-fold CLK signal to ½ time. The terminal 304 is connected to the 1/n-fold multiplier 72 and outputs the CLK signal whose frequency is returned by the 1/n magnification therethrough. The digital image transmission system 2 according to the second embodiment is configured in this manner.

Figure 8A:
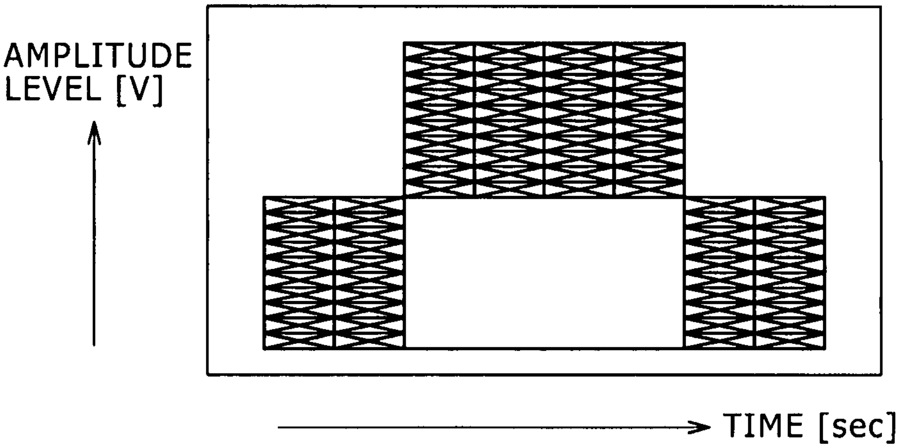
FIGS. 8A to 8C are waveform diagrams illustrating a waveform of a superposition signal, an n-fold CLK signal and a serial control signal used in the digital image transmission system of FIG. 7.
Figure 8B:
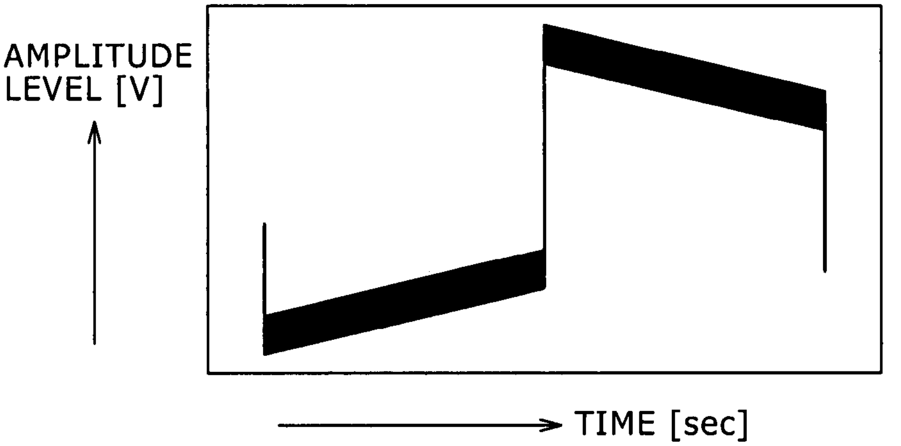
Figure 8C:
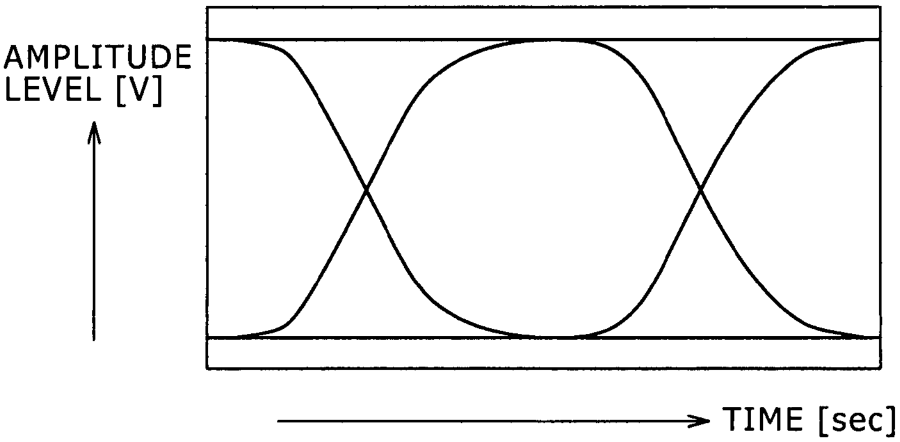
Figure 9:
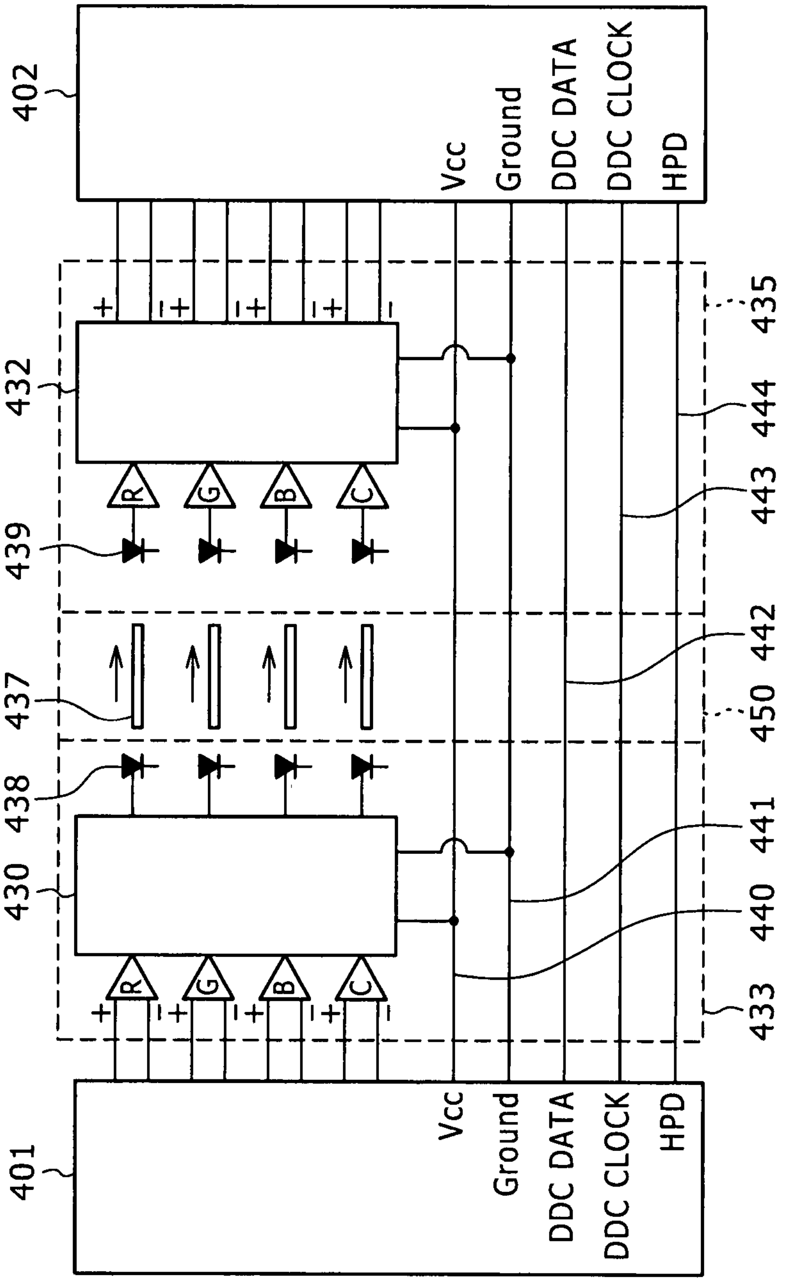
FIG. 9 is a block diagram showing an example of a configuration of a typical digital video signal interface module.

FIGS. 8A, 8B and 8C illustrate an example of the waveform of the superposition signal, n-fold CLK signal and serial control signal SS in the digital image transmission system 2 according to the second embodiment of the present invention, respectively. In FIGS. 8A, 8B and 8C, the axis of abscissa indicates the time, and the axis of ordinate indicates the amplitude level.

FIG. 8A illustrates an example of the waveform of the superposition signal of the n-magnified CLK signal and the serial control signal SS. The waveform indicates a plurality of superposition signals overlapping with each other. In the second embodiment of the present invention, since such an amplitude controller 49 as is provided in the digital image transmission system 1 of the first embodiment is not provided, the amplitude levels of the n-fold CLK signal and the serial control signal SS are set substantially equal to each other. In the digital image transmission system 2 of the second embodiment, the superposition signal of the waveform illustrated in FIG. 8A can be observed as an output signal of the O/E circuit 23 on the receiver side.

FIG. 8B illustrates an example of the waveform of the n-fold CLK signal obtained by removing the serial control signal SS from the superposition signal. In the second embodiment, the n-fold CLK signal of the waveform illustrated in FIG. 8B can be extracted by taking out high frequency components from the superposition signal of the waveform illustrated in FIG. 8A by means of the HPF circuit 71.

FIG. 8C illustrates an example of the waveform of the serial control signal SS extracted by removing the n-fold CLK signal from the superposition signal. This waveform indicates a plurality of serial control signals SS overlapping with each other. In the second embodiment, the serial control signal SS of the waveform illustrated in FIG. 8C is extracted by taking out low frequency components from the superposition signal of the waveform illustrated in FIG. 8A by means of the LPF circuit 25.

In the following, an example of operation of the digital image transmission system 2 which executes a digital image transmission method according to the second embodiment of the present invention is described with reference to FIG. 7.

On the sender side, the CLK signal is inputted through the terminal 204 to the n-fold multiplier 70, by which the frequency thereof is magnified to n times. A resulting n-fold CLK signal is inputted to the E/O circuit 7, by which it is superposed on and subject to electro-optic conversion by the serial control signal SS from the MUX circuit 3. An optical signal for the serial control signal SS+n-fold CLK signal obtained by the opto-electric conversion is transmitted through the optical fiber 15.

On the receiver side, the optical signal for the serial control signal SS+n-fold CLK signal transmitted through the optical fiber 15 is received and is subject to opto-electric conversion by the O/E circuit 23 on the receiver side. The superposition signal obtained by the opto-electric conversion is inputted to the LPF circuit 25 and the HPF circuit 71.

High frequency components are taken out from the superposition signal inputted to the HPF circuit 71 to extract the n-fold CLK signal separate from the serial control signal SS. The extracted n-fold CLK signal is inputted to the amplifier 54, by which the waveform thereof is amplified or shaped. The amplified or shaped n-fold CLK signal is inputted to the 1/n-fold multiplier 72, by which it is magnified to 1/n time. The CLK signal having an original frequency restored by the 1/n magnification is outputted through the terminal 304.

On the other hand, from the superposition signal inputted to the LPF circuit 25, low frequency components are taken out to extract the serial control signal SS separate from the n-fold CLK signal. Forward transmission of the parallel control signals and the n-fold CLK signal by the digital image transmission system 2 of the second embodiment is performed in this manner.

In this manner, in the digital image transmission system 2 according to the second embodiment, the serial control signal SS is superposed on and transmitted together with the n-fold CLK signal produced by magnifying the CLK signal to n times on the sender side.

Accordingly, the difference in frequency band between the n-fold CLK signal and the serial control signal SS increases. Consequently, the S/N ratio is enhanced, and on the receiver side, the n-fold CLK signal can be extracted using the HPF circuit 71. Further, separation of the CLK signal and the serial control signal SS can be performed on the receiver side even if amplitude control of the CLK signal and the serial control signal SS is not performed on the sender side.

The present invention can be applied suitably to a digital image transmission system wherein a digital image signal including at least image signals for color image reproduction, a reference clock signal and parallel control signals is transmitted from a digital image outputting apparatus such as a computer or a video image reproduction apparatus to a digital image inputting apparatus such as a liquid crystal monitor or a projector.

While preferred embodiments of the present invention have been described using specific terms, such description is for illustrative purpose only, and it is to be understood that changes and variations may be made without departing from the spirit or scope of the following claims.

What is claimed is:

1. A digital image sender for transmitting a digital image signal including image signals for color image reproduction, a reference clock signal and parallel control signals, comprising:

a parallel/serial converter configured to convert the parallel control signals into a serial control signal by time division multiplexing;

a superposition element configured to superimpose the serial control signal obtained by the conversion by said parallel/serial converter and the reference clock signal and output a resulting superposition signal, wherein the superposition signal is formed by combining individual optical element driving currents respectively associated with the serial control signal and reference clock which are simultaneously applied to an electrooptic converter;

the electro-optic converter configured to convert the superposition signal outputted from said superposition element from an electric signal into an optical signal, and further wherein the reference clock and at least three parallel control signals are converted via a single electrooptic converter into an optical signal, and wherein an amplitude controller receives the reference clock and serial control signal and provides outputs such that an amplitude of the reference clock has a predetermined relationship to an amplitude of the serial control signal and the amplitude controller provides an output corresponding to the reference clock to an optical element driver having a current signal output and the amplitude controller provides an output to a transistor that controls a further current that is combined with the optical element driver current signal output in order to drive the optical element with the combined current.

2. The digital image sender according to claim 1, wherein said parallel/serial converter includes a frame identifier appending section configured to append, upon the conversion of the parallel control signals into the serial control signal, a frame identifier for allowing a frame synchronization process to be performed upon reception of the serial control signal.

3. The digital image sender according to claim 1, further comprising an amplitude controller provided at a stage preceding to said superposition element, and wherein said amplitude controller compares the amplitudes of the reference clock signal and the serial control signal to be inputted to said superposition element and controls so that the amplitude of the reference clock signal becomes greater than the amplitude of the serial control signal.

4. The digital image sender according to claim 1, wherein said electro-optic converter includes a light amount controller configured to supervise the light amount of the optical signal converted from the electric signal and control the light amount.

5. The digital image sender according to claim 4, wherein said light amount controller determines a coefficient to be used for the control of the light amount in accordance with a fixed arithmetic operation expression or reads out the coefficient from a memory.

6. The digital image sender according to claim 4, wherein a control loop constant of said light amount controller which controls the light amount is lower than a frequency of the serial control signal.

7. The digital image sender according to claim 1, further comprising a multiplier provided at a stage preceding to said superposition element and configured to magnify the frequency of the reference clock signal to be inputted to said superposition element to n times.

8. A digital image sender for transmitting a digital image signal including image signals for color image reproduction, a reference clock signal and parallel control signals, comprising:

parallel/serial conversion means for converting the parallel control signals into a serial control signal by time division multiplexing;

superposition means for superposing the serial control signal obtained by the conversion by said parallel/serial conversion means and the reference clock signal and outputting a resulting superposition signal, wherein the superposition signal is formed by combining individual optical element driving currents respectively associated with the serial control signal and reference clock which are simultaneously applied to an electro-optic conversion means; and further wherein the reference clock and parallel control signals are converted via a single electrooptic converter into an optical signal, and wherein an amplitude controller receives the reference clock and serial control signal and provides outputs such that an amplitude of the reference clock has a predetermined relationship to an amplitude of the serial control signal and the amplitude controller provides an output corresponding to the reference clock to an optical element driver having a current signal output and the amplitude controller provides an output to a transistor that controls a further current that is combined with the optical element driver current signal output in order to drive the optical element with the combined current.

9. A digital image receiver for receiving a digital image signal, which includes image signals for color image reproduction, a reference clock signal and parallel control signals, in the form of an optical signal produced by an electro-optic conversion of a superposition signal wherein a serial control signal converted from the parallel control signals by time division multiplexing and the reference clock signal are superimposed, comprising:

an opto-electric converter configured to convert the received superposition signal from an optical signal into an electric signal, wherein the superposition signal is formed by combining individual optical element driving currents respectively associated with the control signals and reference clock which are simultaneously applied to a transmission electro-optic converter;

a separator configured to separate the superposition signal converted by said opto-electric converter into the reference clock signal and the serial control signal; and a serial/parallel converter configured to convert the serial control signal separated by said separator into parallel control signals by time division demultiplexing and a clock signal which are derived from a common optical signal.

10. The digital image receiver according to claim 9, wherein said serial/parallel converter includes a frame synchronization processor configured to execute a frame synchronization process for the serial control signal separated by said separator based on a frame identifier appended upon transmission.

11. The digital image receiver according to claim 9, wherein said separator includes:

a first signal extractor configured to extract the reference clock signal from the superposition signal converted by said opto-electric converter; and a second signal extractor configured to extract the serial control signal from the superposition signal converted by said opto-electric converter.

12. The digital image receiver according to claim 11, wherein said first signal extractor amplitude limits and amplifies the superposition signal converted by said opto-electric converter to extract the reference clock signal.

13. The digital image receiver according to claim 11, wherein said first signal extractor takes out high frequency components of the superposition signal converted by said opto-electric converter to extract the reference clock signal.

14. The digital image receiver according to claim 11, wherein said second signal extractor takes out low frequency components of the superposition signal converted by said opto-electric converter to extract the serial control signal.

15. The digital image receiver according to claim 11, further comprising a first waveform adjustor provided at a stage next to said first signal extractor and configured to amplify or shape the reference clock signal extracted by said first signal extractor.

16. The digital image receiver according to claim 11, further comprising a second waveform adjustor provided at a stage next to said second signal extractor and configured to amplify or shape the serial control signal extracted by said second signal extractor.

17. The digital image receiver according to claim 10, further comprising a multiplier provided at a stage next to said separator and configured to reduce the reference clock signal separated by said separator to 1/n time.

18. A digital image receiver for receiving a digital image signal, which includes image signals for color image reproduction, a reference clock signal and parallel control signals, in the form of an optical signal produced by electro-optic conversion of a superposition signal wherein a serial control signal converted from the parallel control signals by time division multiplexing and the reference clock signal are superimposed, comprising:

opto-electric conversion means for converting the received superposition signal from an optical signal into an electric signal, wherein the superposition signal is formed by combining individual optical element driving currents respectively associated with the serial control signal and reference clock which are simultaneously applied to a transmission electrooptic converter;

separation means for separating the superposition signal converted by said opto-electric conversion means into the reference clock signal and serial control signal; and serial/parallel conversion means for converting the serial control signal separated by said separation means into parallel control signals by time division demultiplexing, and further wherein the reference clock and parallel control signals are converted from a single optical signal.

19. A digital image transmission system, comprising:

a digital image sender which transmits a digital image signal including image signals for color image reproduction, a reference clock signal and parallel control signals; and a digital image receiver which receives the digital image signal from said digital image transmission apparatus;

said digital image sender including a parallel/serial converter configured to convert the parallel control signals into a serial control signal by time division multiplexing, a superposition element configured to superimpose the serial control signal obtained by the conversion by said parallel/serial converter with the reference clock signal and output a resulting superposition signal, wherein the superposition signal is formed by combining individual optical element driving currents respectively associated with the serial control signal and reference clock which are simultaneously applied to an electrooptic converter, and wherein an amplitude controller receives the reference clock and serial control signal and provides outputs such that an amplitude of the reference clock has a predetermined relationship to an amplitude of the serial control signal and the amplitude controller provides an output corresponding to the reference clock to an optical element driver having a current signal output and the amplitude controller provides an output to a transistor that controls a further current that is combined with the optical element driver current signal output in order to drive the optical element with the combined current and the electro-optic converter configured to convert the superposition signal outputted from said superposition element from an electric signal into an optical signal;

said digital image receiver including an opto-electric converter configured to convert the received superposition signal from an optical signal into an electric signal, a separator configured to separate the superposition signal converted by said opto-electric converter into the reference clock signal and the serial control signal, and a serial/parallel converter configured to convert the serial control signal separated by said separator into parallel control signals by time division demultiplexing, and further wherein the reference clock and parallel control signals are converted from a single optical signal.

20. The digital image transmission system according to claim 19, wherein said digital image receiver further includes a reception processor configured to perform a process of receiving the digital image signal;

a parallel/serial converter converting the parallel control signals from said reception processor into the serial control signal by time division multiplexing;

an electro-optic converter converting the serial control signal converted by said parallel/serial converter from an electric signal into an optical signal;

said opto-electric converter of said digital image sender converting the received serial control signal from an optical signal into an electric signal;

said serial/parallel converter converting the serial control signal converted by said opto-electric converter further into parallel control signals by time division demultiplexing.

21. A digital image transmission method for transmitting a digital image signal including image signals for color image reproduction, a reference clock signal and parallel control signals, comprising the steps executed on the sender side of the digital image signal of:

converting the parallel control signals into a serial control signal by time division multiplexing;

superposing the serial control signal obtained by the conversion with the reference clock signal and wherein an amplitude controller receives the reference clock and serial control signal and provides outputs such that an amplitude of the reference clock has a predetermined relationship to an amplitude of the serial control signal and the amplitude controller provides an output corresponding to the reference clock to an optical element driver having a current signal output and the amplitude controller provides an output to a transistor that controls a further current that is combined with the optical element driver current signal output in order to drive the optical element with the combined current; and converting the superposition signal from an electric signal into an optical signal, wherein the superposition signal is formed by combining individual optical element driving currents respectively associated with the serial control signal and reference clock which are simultaneously applied to an electrooptic converter; and the steps executed on the receiver side of the digital image signal of:

converting the received superposition signal from an optical signal into an electric signal;

separating the superposition signal obtained by the conversion into the reference clock signal and the serial control signal; and converting the separated serial control signal into parallel control signals by time division demultiplexing, and further wherein the reference clock and parallel control signals are converted from a single optical signal.

22. The digital image transmission method according to claim 21, further comprising the steps executed by the receiver side of the digital image signal of:

converting the parallel control signals from a reception processor, which receives and processes the digital image signal, into the serial control signal by time division multiplexing; and converting the serial control signal obtained by the conversion from an electric signal into an optical signal; and the steps executed by the sender side of the digital image signal of:

converting the received serial control signal from an optical signal into an electric signal; and converting the serial control signal obtained by the conversion further into parallel control signals by time division demultiplexing.

* * * * *